United States Patent
Cafasso et al.

(10) Patent No.: US 10,028,485 B2
(45) Date of Patent: Jul. 24, 2018

(54) GROOMING TOOL AND METHODS

(71) Applicant: Spectrum Brands, Inc., Middleton, WI (US)

(72) Inventors: Daniel Cafasso, Cincinnati, OH (US); Adam Favia, Reedsburg, WI (US); Kelly Damaschke, Loganville, WI (US); Ron Wright, Baraboo, WI (US)

(73) Assignee: Spectrum Brands, Inc., Middleton, WI (US)

( * ) Notice: Subject to any disclaimer, the term of this patent is extended or adjusted under 35 U.S.C. 154(b) by 71 days.

(21) Appl. No.: 14/854,270

(22) Filed: Sep. 15, 2015

(65) Prior Publication Data
US 2016/0073612 A1 Mar. 17, 2016

Related U.S. Application Data

(60) Provisional application No. 62/050,875, filed on Sep. 16, 2014.

(51) Int. Cl.
| | |
|---|---|
| *A01K 13/00* | (2006.01) |
| *B25G 1/10* | (2006.01) |
| *A45D 24/00* | (2006.01) |
| *A45D 24/10* | (2006.01) |

(52) U.S. Cl.
CPC .......... *A01K 13/002* (2013.01); *A45D 24/00* (2013.01); *A45D 24/10* (2013.01); *B25G 1/102* (2013.01)

(58) Field of Classification Search
CPC ...... A01K 13/002; A01K 13/00; A45D 24/02; A45D 24/06; A45D 24/00; A45D 24/08; A45D 24/04
See application file for complete search history.

(56) References Cited

U.S. PATENT DOCUMENTS

| | | | | |
|---|---|---|---|---|
| 1,093,107 | A | | 4/1914 | Burns |
| 1,663,078 | A | * | 3/1928 | Solomon ................. A45D 2/42 132/118 |
| 3,424,174 | A | * | 1/1969 | Battaglia ................ A45D 24/08 132/143 |
| 3,878,855 | A | | 4/1975 | Ransaw |
| 4,970,990 | A | * | 11/1990 | Wilhelmi ............. A01K 13/002 119/601 |
| 5,339,840 | A | * | 8/1994 | Koppel ................. A45D 24/04 119/625 |
| 6,955,137 | B2 | * | 10/2005 | Dunn ................... A01K 13/002 119/617 |
| 7,748,350 | B2 | * | 7/2010 | Vandervoet .......... A01K 13/002 119/618 |
| 8,359,755 | B1 | * | 1/2013 | Laube ................. A01K 13/002 119/611 |
| 9,301,499 | B2 | * | 4/2016 | Holt, Jr. .............. A01K 13/002 |

(Continued)

OTHER PUBLICATIONS

Notification of Transmittal of the International Search Report and the Written Opinion of the International Searching Authority, or the Declaration dated Nov. 11, 2015 (13 pages).

*Primary Examiner* — Kristen C Hayes
(74) *Attorney, Agent, or Firm* — Merchant & Gould P.C.

(57) ABSTRACT

A grooming tool includes a handle and a head attached to the handle. The head has curved blades adjustable in at least an extended position and a non-extended position. Methods of grooming an animal can include selecting the length of the curved blades by adjusting the blades in at least an extended position or non-extended position.

38 Claims, 6 Drawing Sheets

(56) References Cited

U.S. PATENT DOCUMENTS

| | | | |
|---|---|---|---|
| 9,351,476 B2* | 5/2016 | Harris, II | A01K 13/002 |
| 2004/0194728 A1 | 10/2004 | Dunn et al. | |
| 2008/0066690 A1 | 3/2008 | Rosen | |
| 2008/0115735 A1* | 5/2008 | Wang | A01K 13/002 |
| | | | 119/614 |
| 2014/0026822 A1* | 1/2014 | Harris, II | A01K 13/002 |
| | | | 119/628 |
| 2014/0238310 A1* | 8/2014 | Holt, Jr. | A01K 13/002 |
| | | | 119/631 |

* cited by examiner

GROOMING TOOL AND METHODS

CROSS-REFERENCE TO RELATED APPLICATION

This application claims the benefit of provisional application Ser. No. 62/050,875, filed Sep. 16, 2014, which is incorporated herein by reference in its entirety.

TECHNICAL FIELD

This disclosure relates to a grooming tool and methods of use. More particularly, this disclosure relates to a grooming tool, such as a dematting tool for animals, such as dogs or cats.

BACKGROUND

A variety of grooming tools are usable to groom pets. These tools can be used to remove loose hair or fur, tangled hair or fur, and matted hair or fur.

Some animals have coats in which the hair length varies between short at some portions and long at other portions. Some people own a variety of pets, in which some of the pets have long coats, while other pets have shorter coats. In these instances, it would be convenient to have a single tool for grooming, in which this single tool could be used on coats of varying lengths.

SUMMARY

A grooming tool is provided to address and overcome the problems in the prior art. In particular, a grooming tool is provided that has a handle and a head attached to the handle. The head has a plurality of curved blades that are adjustable in at least an extended position and a non-extended position.

By having the blades adjustable between at least an extended position and a non-extended position, the grooming tool can be used on hair or fur of varying lengths. For shorter hair, the curved blades can be used in the non-extended position, while for longer hair, the blades can be used in the extended position.

The grooming tool as described herein is especially suitable for use as a dematting tool, to remove matted hair or fur. It is contemplated, however, that the grooming tool could be used in other applications.

In example embodiments, the curved blades are releasably lockable in at least the extended position and non-extended position.

In example embodiments, the head includes a blade carrier holding the plurality of blades in a fixed position in the blade carrier.

In example embodiments, the head includes a housing having an interior volume therein, and the blade carrier is operably positioned in the interior volume of the housing and constructed and arranged to be adjustable in at least a first position and second position. The blades may have a proximal portion adjacent to the blade carrier and a distal portion spaced from the blade carrier. When the blade carrier is in the first position, the blades are in the extended position. When the blade carrier is in the second position, the blades are in the non-extended position, and the distal portion of the blades is spaced nearer the housing than when in the extended position.

In example embodiments, the head includes a blade adjuster operably associated with the blade carrier to move the blade carrier between the first position and the second position.

In example embodiments, the head includes a locking tab arrangement constructed and arranged to releasably lock the blade carrier in at least the first position and the second position.

In one or more example embodiments, the blade carrier includes first and second grooves therein. The locking tab arrangement includes a first tab and a second tab. The first tab has a first locking finger slidably located in the first groove, and the second tab has a second locking finger slidably located in the second groove.

In example embodiments, the blade carrier has first groove teeth along the first groove and second groove teeth along the second groove. The first locking finger of the first tab has first tab teeth, and the second locking finger of the second tab has second tab teeth. The first tab teeth releasably engages the first groove teeth, and the second tab teeth releasably engages the second groove teeth to releasably lock the blade carrier in the first position and second position.

In example embodiments, the locking tab arrangement further includes a spring compressed between the first tab and second tab.

In some example embodiments, the blade adjuster includes a plate having a finger mount projecting outside of the housing and an engagement bar oriented against the blade carrier.

In some example embodiments, the blade adjuster further includes a spring oriented between the housing and the plate.

In one or more example embodiments, the handle has a gripping member sized for gripping by a human hand and has a longitudinal axis therethrough. The head has a longitudinal axis non-coaxial with the gripping member longitudinal axis.

In some example embodiments, the handle includes a V-shaped bridge between the gripping member and the head.

In example embodiments, the curved blades are curved between 60-90 degrees.

In example embodiments, a distance between the extended position and non-extended position of the blades ranges between 3-10 mm.

In example embodiments, there are 10-20 curved blades in the head.

In accordance with principles of this disclosure, a method of grooming an animal is provided. The method includes providing a grooming tool having a handle and a head attached to the handle. The head has a plurality of curved blades. The method includes selecting the length of the curved blades to use by adjusting the blades in at least an extended position or a non-extended position.

In example methods, the step of selecting the length includes using a blade adjuster to move the blades in one of the extended position or non-extended position.

In example methods, the step of selecting the length includes squeezing first and second tabs toward each other to permit a blade carrier to move when pushed by the blade adjuster, and releasing the first and second tabs to lock the blade carrier in position.

A variety of examples of desirable product features or methods are set forth in part in the description that follows, and in part, will be apparent from the description, or may be learned by practicing various aspects of the disclosure. The aspects of the disclosure may relate to individual features as well as combinations of features. It is to be understood that both the forgoing general description and the following detailed description are explanatory only, and are not restrictive of the claimed invention.

DETAILED DESCRIPTION

A grooming tool is provided to address the problems of the prior art. In particular, the grooming tool, as described herein, includes curved blades for grooming, such as dematting, and which are adjustable between an extended position and a non-extended position. This allows the user to select what length of blades to use on an animal, based on the length of the hair or fur of the coat of the animal. It can also be adjusted for the same animal, in which the length of the coat varies, depending on where the hair is located. The length of the blades are adjustable in a convenient manner and without the use of tools. The length of the blades can be quickly and easily adjusted through easy hand manipulation. The grooming tool is especially useful for removing mats on the coats of pets.

FIGS. 1-4 and 7 illustrate one embodiment of a grooming tool 10. The grooming tool 10 has a handle 12 and a head 14 attached to the handle 12. The head 14 can be permanently attached to the handle 12, as illustrated in the FIGS. Alternatively, in some embodiments, the head 14 can be removably attached to the handle 12.

The handle 12 has a gripping member 16. The gripping member 16 is sized for gripping by a typical human hand. Many variations are possible. In the example embodiments shown, the gripping member 16 includes friction-enhancing regions 18 along the gripping member 16 to help improve the grip between the person's hand and the gripping member 16. The friction-enhancing regions 18 can be made from plastic, urethane, rubber, or rubber-like materials to improve the grip.

The handle 12 may further include a bridge member 20 between the gripping member 16 and the head 14. In the example embodiment shown, the bridge member 20 is a V-shaped bridge member 21 and is angled between the head 14 and the gripping member 16.

Figure 4:
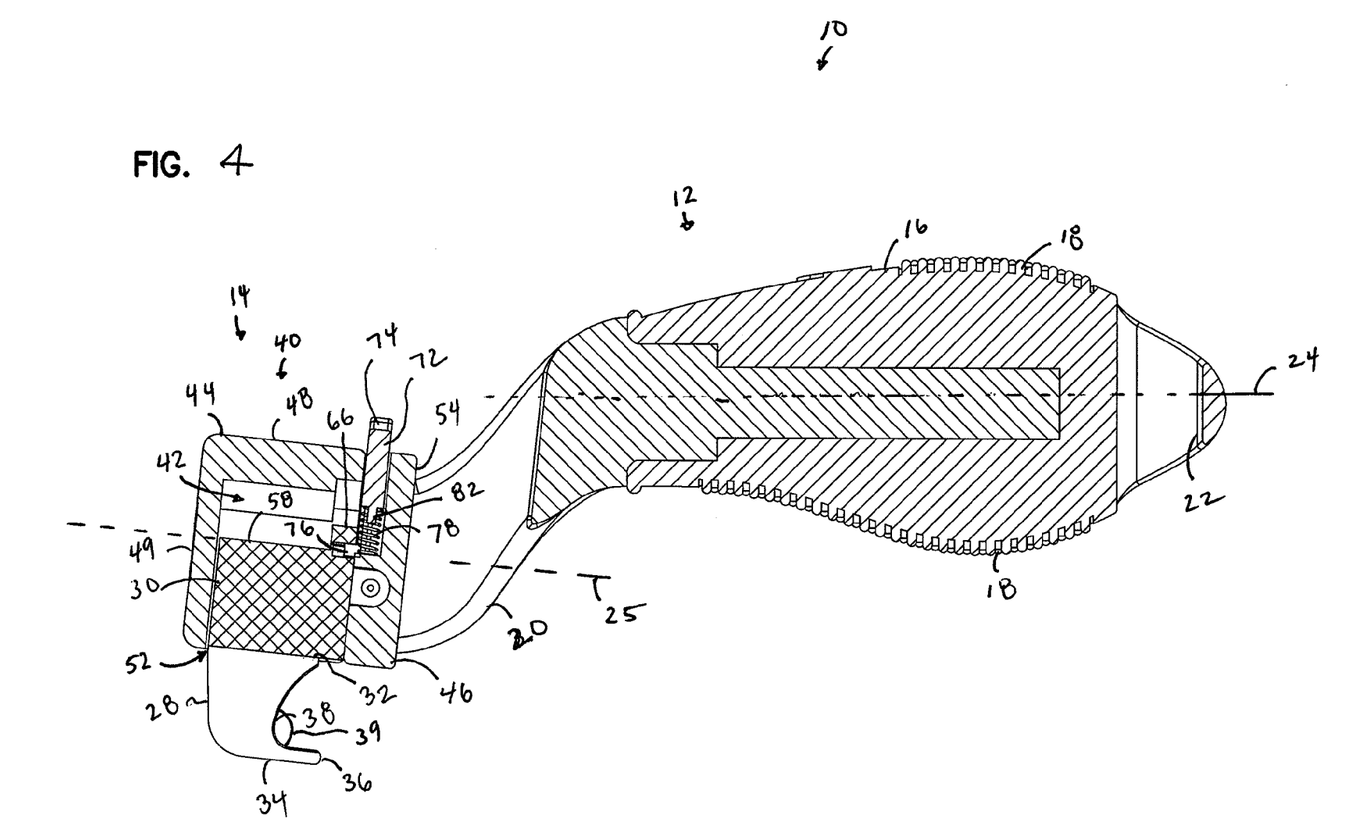
FIG. 4 is a cross-sectional view of the grooming tool of FIG. 1, the cross-section being taken along the line 4-4 of FIG. 1, and showing the blades in an extended position.
Figure 5:
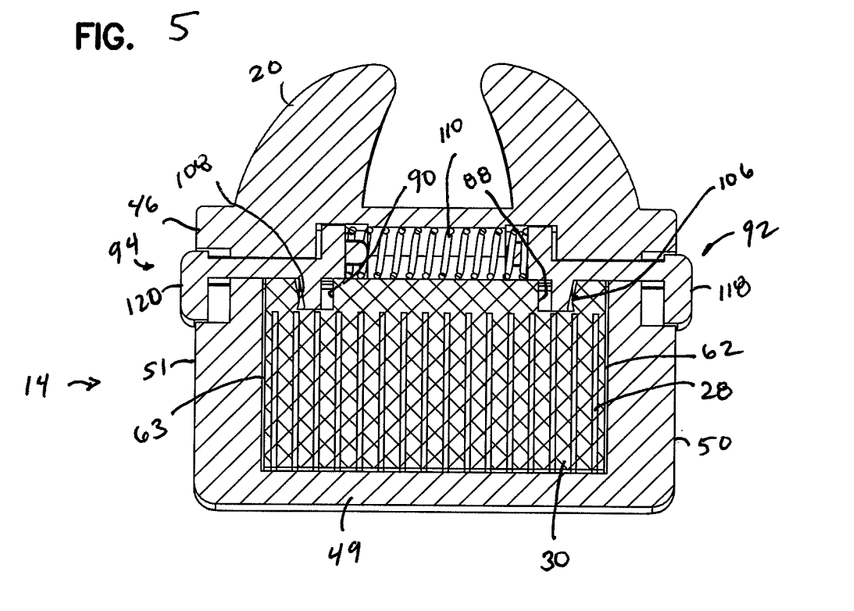
FIG. 5 is a cross-sectional view of the grooming tool of FIG. 1, the cross-section being taken along the line 5-5 of FIG. 1.

Attention is directed to FIG. 4. In the example shown, the handle 12 is arranged ergonomically with respect to the head 14. For example, in FIG. 4, it can be seen that the gripping member 16 defines a longitudinal axis 24 therethrough. The head 14 likewise defines a longitudinal axis at 25. The longitudinal axis 25 of the head 14 is non-coaxial with the longitudinal axis 24 of the gripping member 16. The bridge member 20 will typically intersect the longitudinal axis 24 of the gripping member 16 and longitudinal axis 25 of the head 14.

The handle 12 can further include, in some embodiments, a hang hole 22. In the illustrated embodiments, the handle 12 includes hang hole 22 through the gripping member 16, adjacent to an end of the tool 10 opposite of the location of the head 14.

Figure 7:
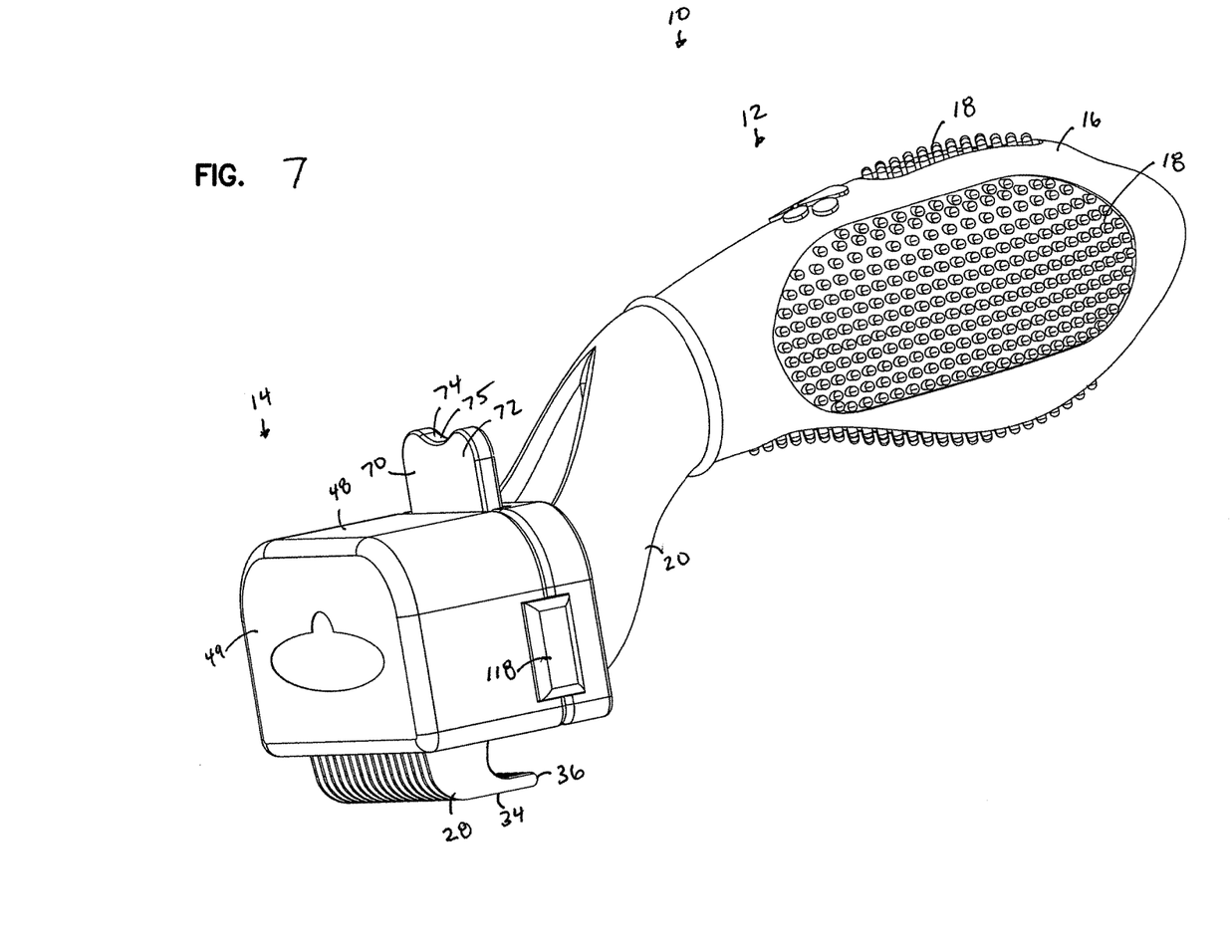
FIG. 7 is another perspective view of the grooming tool of FIGS. 1-5, and showing the blades in a non-extended position.

The head 14 has a plurality of grooming blades 28. The grooming blades 28 are preferably curved in dimension. The blades 28 are adjustable in at least an extended position (FIGS. 1, 2, and 4) and a non-extended position (FIG. 7).

Many variations are possible. In preferred implementations, a distance between the extended position (FIG. 4) and non-extended position (FIG. 7) ranges between 3-10 mm.

In preferred implementations, the blades 28 are releasably lockable in at least the extended position and non-extended position. In some embodiments, it is contemplated that the blades 28 can be locked in positions between the extended position and non-extended position.

Figure 1:
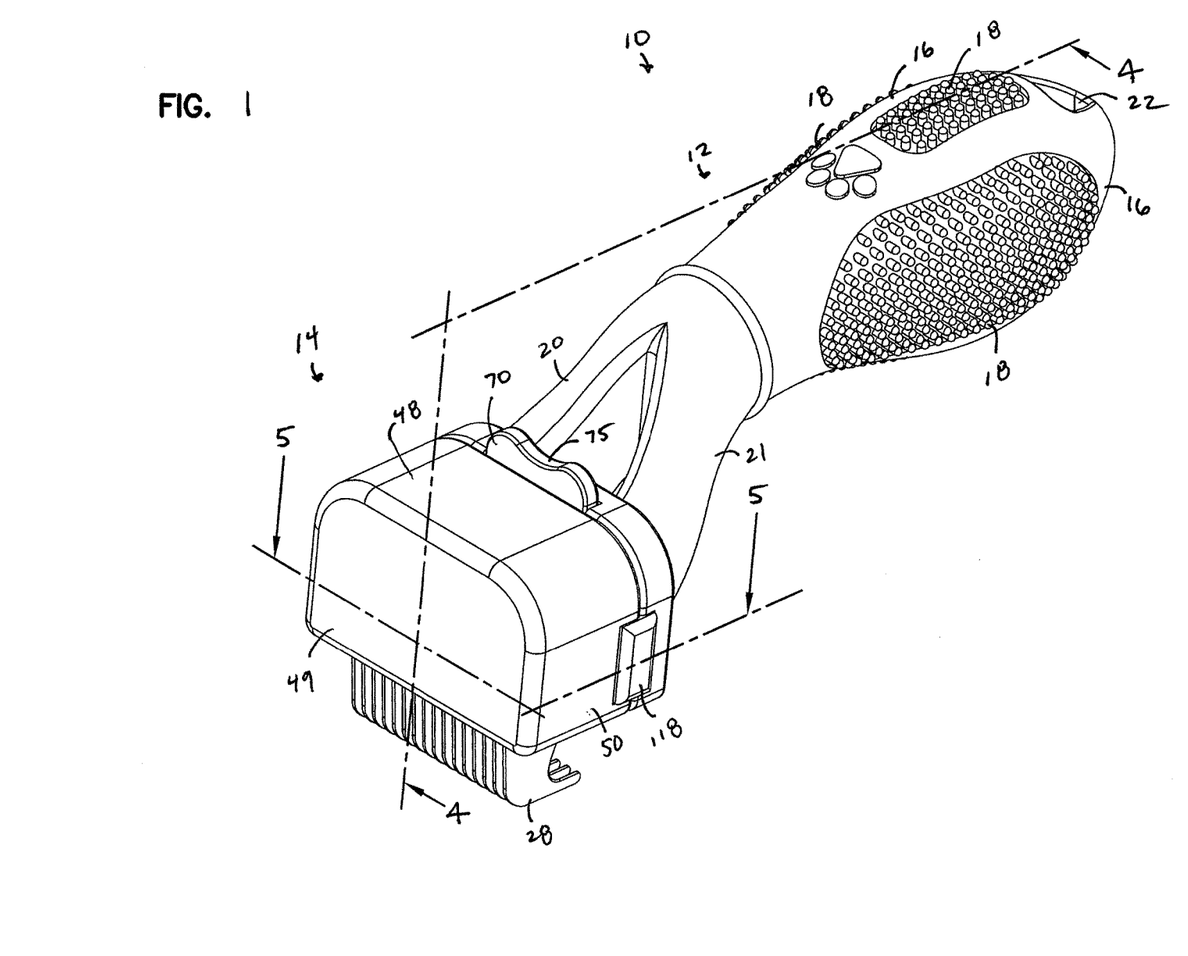
FIG. 1 is a perspective view of one embodiment of a grooming tool, constructed in accordance with principles of this disclosure.
Figure 2:
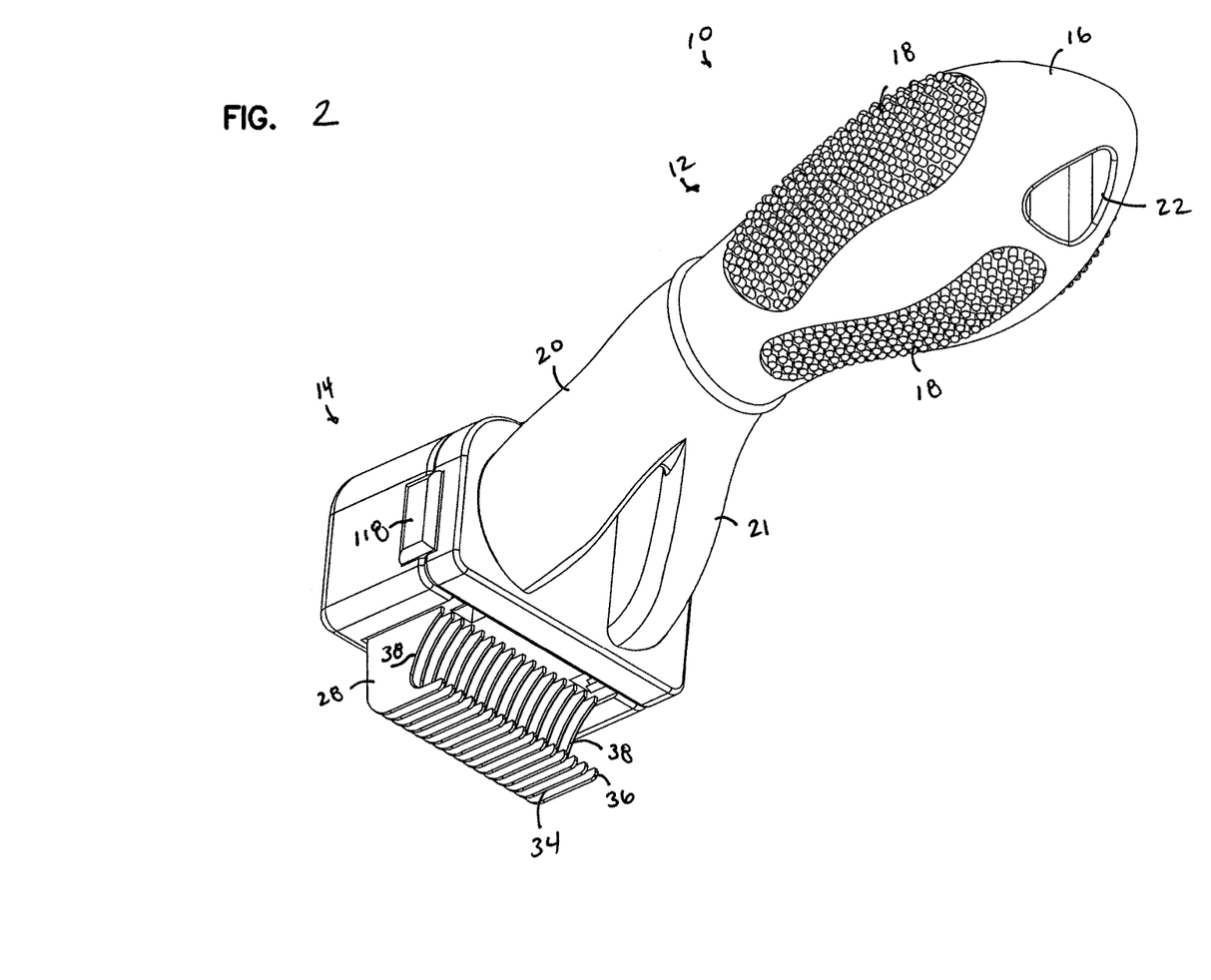
FIG. 2 is another perspective view of the grooming tool of FIG. 1.
Figure 3:
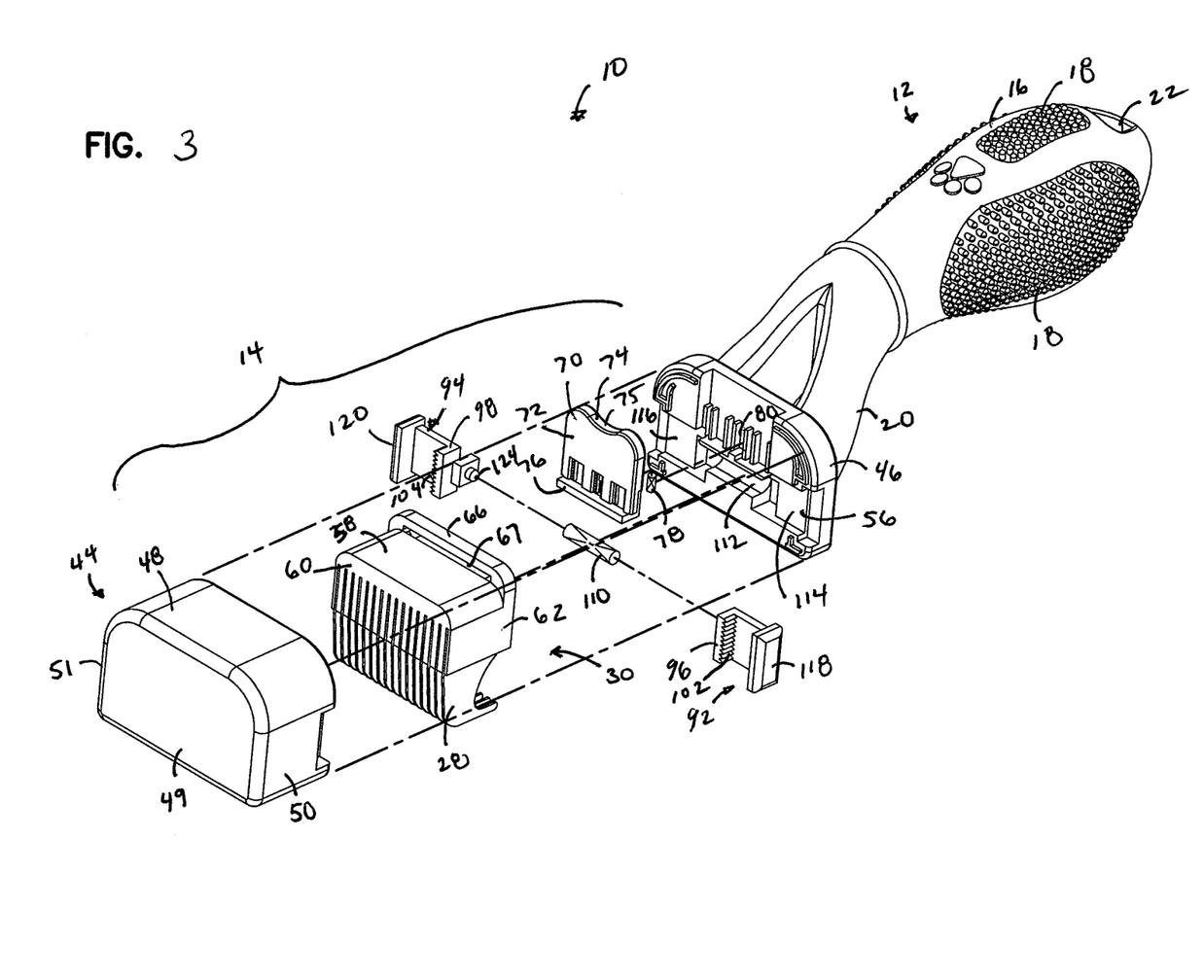
FIG. 3 is an exploded, perspective view of the grooming tool of FIGS. 1 and 2.

Attention is directed to the exploded view of FIG. 3. Many variations are possible. In the particular embodiment illustrated in FIG. 3, the head 14 includes a blade carrier 30. The blade carrier 30 can be used to hold the plurality of blades 28 in a fixed position in the blade carrier 30. In some embodiments, the blades 28 are permanently mounted, molded, or embedded into the blade carrier 30.

In many examples, there will be 8-24 curved blades 28 in the head 14. For example, in the embodiment shown, there are 16 blades 28 permanently and non-removably secured within the blade carrier 30. In smaller versions, there can be 8 blades 28, while in larger version, there can be 24 blades 28.

In FIG. 4, the blades 28 define a proximal portion 32 adjacent to the blade carrier 30. In the example shown, the proximal portion 32 is secured within the blade carrier 30. The blades 28 also have a distal portion 34 spaced from the blade carrier 30. The distal portion 34 defines free-end tips 36 (FIG. 4). The blades 28 have a grooming or cutting edge 38 that is curved between the end tips 36 as it extends from the end tip 36 to the proximal portion 32. The cutting edge 38 can be curved at many different angles 39 (FIG. 4) including, for example, 60-90 degrees.

In reference now to FIG. 4, the head 14 includes a housing 40 having an interior volume 42 therein. The housing 42 can include, for example, a container 44 and a base 46. The container 44 will be operably secured to the base 46 to define the volume 42 therein.

In the example shown, the container 44 includes a top wall 48, a front wall 49 extending from the top wall 48, and first and second side walls 50, 51 extending from the top wall 48. The container 44 has an open bottom 52, opposite of the top wall 48, to accommodate the blade carrier 30 therein.

The base 46 has a handle engaging side 54. The handle engaging side 54 is secured to the handle 12. In the example shown, the handle engaging side 54 is secured to the bridge member 20 of the handle 12. The base 46 has, on a side opposite of the handle-engaging side 54, a head-engaging side 56 (FIG. 3). The head-engaging side 56 can include structure for holding blade adjusting parts, to be described further below.

The blade carrier 30 is operably positioned in the interior volume 42 of the housing 40. For example, the blade carrier 30 can be positioned within the container 44, such that the cutting edges 38 of the blades 28 operably project or extend from the open bottom 52 of the container 44.

The blade carrier 30 is operably positioned in the interior volume 42 of the housing 40 and is constructed and arranged to be adjustable in at least a first position and a second position. When the blade carrier 30 is in the first position (FIGS. 1, 2, and 4), the blades 28 are in the extended position. When the blade carrier 30 is in the second position (FIG. 7), the blades 28 are in the non-extended position, and the distal portion 34 of the blades 28 is spaced nearer the housing 40 than when in the extended position.

Figure 6:
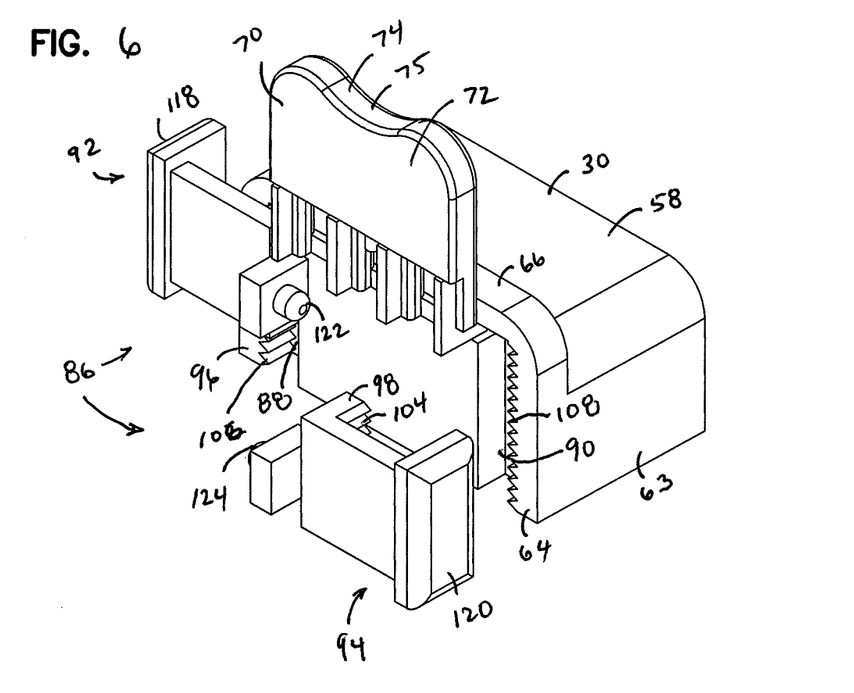
FIG. 6 is an exploded, perspective view of a sub-assembly of the grooming tool of FIGS. 1-5.

Many embodiments are possible. In the example shown, the blade carrier 30 has a top wall 58, a front wall 60 extending from the top wall 58, and opposite first and second side walls 62 (FIG. 3), 63 (FIG. 6) extending from the top wall 58. Opposite of the front wall 60 is a rear wall 64 (FIG. 6). The rear wall 64 includes structure for locking engagement, to be described further below.

The blade carrier 30, in this illustrated embodiment, can further include an adjustment bar 66 along the top wall 58 and adjacent the rear wall 64. The adjustment bar 66 is illustrated as spaced from the top wall 58 to define a receiving groove 67 (FIG. 3). The receiving groove 67 can be engaged with other structure to push the blade carrier 30 into the extended position. Example details are described further below.

In FIG. 3, while many embodiments are possible, it can be seen how, in this embodiment, the blades 28 are non-removably embedded in the blade carrier 30, such that the cutting edges 38 project or extend from a bottom section 68, which is opposite of the top wall 58. In other embodiments, the blades 28 may be removable mounted to the blade carrier 30.

The head 14 includes a blade adjuster 70. The blade adjuster 70 can be operably associated with the blade carrier 30 to move the blade carrier 30 between the first position (FIG. 1) and the second position (FIG. 7).

Many embodiments are possible. In the example illustrated, the blade adjuster 70 includes a plate 72. The plate 72 can be used to apply a pushing force against the blade carrier 30.

In FIG. 3, in the example shown, the plate 72 has a finger mount 74 projecting outside of the housing 40. In this way, the finger mount 74 can be used by a person's finger, such as index finger, to exert a pushing force in the finger mount 74. The finger mount 74 is shown as a curved indent 75 along an upper portion of the plate 72.

Still in reference to FIG. 3, the blade adjuster 70 can include an engagement bar 76. The engagement bar 76 can be engaged or oriented against the blade carrier 30, such that a pushing force in the finger mount 74 translates through the plate 72, to the engagement bar 76 and to the blade carrier 30. FIG. 4 illustrates the engagement bar 76 of the blade adjuster 70 against the blade carrier 30. In the particular illustrated example, the engagement bar 76 is between the adjustment bar 66 and a remaining portion of the top wall 58 of the blade carrier 30 to rest in the groove 67 (FIG. 3).

The blade adjuster 70 can further include a spring 78. The spring 78 is useful for returning the blade carrier 30 to the second position, in which the blades 28 are in the non-extended position (FIG. 7). As further described, in preferred implementations, when the blade carrier 30 is unlocked from the housing 40, the spring 78 will urge the blade carrier 30 from the first position (blades 28 extended) to the second position (blades 28 non-extended).

The spring 78 can be oriented between the housing 40 and the plate 72. For example, as illustrated in FIG. 3, the base 46 can include a spring mount 80 to hold the spring 78 in an operable position. A protrusion 82 (FIG. 4) that is part of the plate 72 mounts the spring 78 to the plate 72, while the spring 78 is also supported within the spring mount 80 in the base 46.

The head 14 further includes a locking tab arrangement 86 (FIG. 6). The locking tab arrangement 86 is constructed and arranged to releasably lock the blade carrier 30 in at least the first position and the second position. The locking tab arrangement 86, in the embodiment shown, will engage the blade carrier 30 through interaction along the rear wall 64 of the blade carrier 30.

For example, and in reference now to FIG. 6, the blade carrier 30, along its rear wall 64, has a first groove 88 extending between the top wall 58 and bottom section 68, and a second groove 90 extending between the top wall 58 and bottom section 68. The first and second grooves 88, 90 will accommodate the locking tab arrangement 86 slidably therein.

In particular, in the example illustrated, the locking tab arrangement 86 includes a first tab 92 and a second tab 94. The first tab 92 has a first locking finger 96 which is slidably located in the first groove 88. The second tab 94 has a second locking finger 98, which is slidably located within the second groove 90.

Many embodiments are possible. In the illustrated embodiment, the first locking finger 96 has first tab teeth 102, and the second locking finger 98 has second tab teeth 104. The blade carrier 30 has first groove teeth 106 along the first groove 88 and second groove teeth 108 along the second groove 90. To releasably lock the blade carrier 30 in at least one of the first position and second position, the first tab teeth 102 releasably engages the first groove teeth 106, and the second tab teeth 104 releasably engages the second groove teeth 108.

The first and second tabs 92, 94 can be moved laterally within the first groove 88 and second groove 90 to move the respective engaging teeth 102, 106 and 104, 108 into and out of engagement. For example, when the first tab 92 and second tab 94 are moved or squeezed in a direction toward each other and toward the housing 40, the respective teeth pairs 102, 106 and 104, 108 are moved out of engagement. When the tabs 92, 94 move apart from each other, the respective engaging teeth pairs 102, 106 and 104, 108 are moved back into engagement.

A spring 110 can be used to compress between the first tab 92 and second tab 94. The spring 110 is illustrated as being mounted to hold the first tab 92 and second tab 94 in locking engagement with the blade carrier 30. In FIG. 3, the base 46 has a chamber 112 to operably hold the spring 110 in place. The first tab 92 and second tab 94 can include a spring post 122 (FIG. 6), 124 (FIG. 3), respectively, projecting from the locking fingers 96, 98, respectively, on a side of the locking fingers 96, 98 opposite of the tab teeth 102, 104. The spring posts 122, 124 will help to hold the spring 110 in operable position between the tabs 92, 94. The base 46 also has a first holding region 114 for the first tab 92, and a second holding region 116 for the second tab 94.

The first tab 92 has a first tab push member 118 extending from the housing 40. The first tab push member 118 is connected to the first locking finger 96, which rests within the first groove 88. The second tab 94 has a second tab push member 120, which extends or projects from the housing 40. The second tab push member 120 is connected to the second locking finger 98, which rests within the second groove 90 of the blade carrier 30.

In operation, to groom an animal, a method can be following including providing the grooming tool 10. Next, the length of the curved blades 28 is selected. The length of the blades 28 is adjusted in at least one of the extended position (FIG. 1) or non-extended position (FIG. 7).

To select the length, the blade adjuster 70 is used to move the blades 28 into the extended position or non-extended position.

To select the length, the first and second tabs 92, 94 are squeezed toward each other. This is done by pushing the first tab push member 118 and the second tab push member 120 inwardly toward each other and toward the housing 40. This pushes against the spring 110 and will unlock the first tab teeth 102 on the first locking finger 96 from the first groove teeth 106 in the blade carrier 30. This will unlock the second tab teeth 104 on the second locking finger 98 of the second tab 94 from the second groove teeth 108 on the blade carrier 30.

When the blade carrier 30 is unlocked, the plate 72 can be pushed by placing force on the finger mount 74 and pressing against the spring 78. This will transmit the pushing force from the engagement bar 76 on the plate 72 against the blade carrier 30 to move the blade carrier 30 in a direction away from the top wall 48 of the container 44. The blades 28 will move into the extended position, such that the distal portion 34 is at a location farther away from the housing 40 than when the blades 28 are in the non-extended position.

To return the blades 28 to the non-extended position, the first tab push member 118 and second tab push member 120 are again squeezed in a direction toward each other, which will unlock the blade carrier 30. The blade carrier 30 will then move with the spring 78 back into the second position, in which the blades 28 are in the non-extended position.

Many different constructions are possible. In preferred implementations, the blades 28 are made from metal, while the remaining portions of the tool 10 are molded plastic. The springs 110 and 78 may also be metal.

The above represents principles of this disclosure. Many embodiments can be made using these principles.

What is claimed is:

1. A grooming tool comprising:
   (a) a handle; and
   (b) a head attached to the handle; the head having a plurality of curved blades, the plurality of curved blades being linearly movable relative to the handle between an extended position and a non-extended position.

2. The grooming tool of claim 1 wherein the curved blades are releasably lockable in at least the extended position and non-extended position.

3. The grooming tool of claim 1 wherein the head includes a blade carrier holding the plurality of blades in a fixed position in the blade carrier.

4. The grooming tool of claim 3 wherein:
   (a) the head includes a housing having an interior volume therein; and
   (b) the blade carrier is operably positioned in the interior volume of the housing and constructed and arranged to be adjustable in at least a first position and second position;
   (c) the blades having a proximal portion adjacent to the blade carrier, and a distal portion spaced from the blade carrier;
      (i) when the blade carrier is in the first position, the blades are in the extended position; and
      (ii) when the blade carrier is in the second position, the blades are in the non-extended position and the distal portion of the blades is spaced nearer the housing than when in the extended position.

5. The grooming tool of claim 4 wherein the head includes a blade adjustor operably associated with the blade carrier to move the blade carrier between the first position and the second position.

6. The grooming tool of claim 5 wherein the head includes a locking tab arrangement constructed and arranged to releasably lock the blade carrier in at least the first position and the second position.

7. The grooming tool of claim 6 wherein:
   (a) the blade carrier includes first and second grooves therein; and
   (b) the locking tab arrangement includes a first tab and second tab;
      (i) the first tab having a first locking finger slidably located in the first groove; and
      (ii) the second tab having a second locking finger slidably located in the second groove.

8. The grooming tool of claim 7 wherein:
   (a) the blade carrier has first groove teeth along the first groove and second groove teeth along the second groove; and
   (b) the first locking finger of the first tab has first tab teeth, and the second locking finger of the second tab has second tab teeth;
   wherein the first tab teeth releasably engages the first groove teeth, and the second tab teeth releasably engages the second groove teeth to releasably lock the blade carrier in the first position and second position.

9. The grooming tool of claim 7 wherein the locking tab arrangement further includes a spring compressed between the first tab and second tab.

10. The grooming tool of claim 5 wherein the blade adjustor includes a plate having a finger mount projecting outside of the housing and an engagement bar oriented against the blade carrier.

11. The grooming tool of claim 10 wherein the blade adjuster further includes a spring oriented between the housing and the plate.

12. The grooming tool of claim 1 wherein:
   (a) the handle has a gripping member sized for gripping by a human hand and having a longitudinal axis therethrough; and
   (b) the head has a longitudinal axis non-coaxial with the gripping member longitudinal axis.

13. The grooming tool of claim 12 wherein the handle includes a v-shaped bridge between the gripping member and the head.

14. The grooming tool of claim 1 wherein the curved blades are curved between 60-90°.

15. The grooming tool of claim 1 wherein there are 10-20 curved blades in the head.

16. A method of grooming an animal, the method comprising:
   (a) providing a grooming tool having a handle and a head attached to the handle; the head having a plurality of curved blades; and
   (b) selecting a length of the curved blades to use by moving the blades linearly relative to the handle to an extended position or a non-extended position.

17. The method of claim 16 wherein the step of selecting the length includes using a blade adjuster and to move the blades in one of the extended position or non-extended position.

18. The method of claim 17 wherein the step of selecting the length includes squeezing first and second tabs toward each other to permit a blade carrier to move when pushed by the blade adjuster, and releasing the first and second tabs to lock the blade carrier in position.

19. A method of grooming an animal according to claim 16 wherein
the step of selecting a length of the curved blades includes selecting a distance between the extended position and non-extended position ranges being between 3-10 mm.

20. The method of claim 19 wherein the step of selecting the length includes using a blade adjuster and to move the blades in one of the extended position or non-extended position.

21. The method of claim 19 wherein the step of selecting the length includes squeezing first and second tabs toward each other to permit a blade carrier to move when pushed by the blade adjuster, and releasing the first and second tabs to lock the blade carrier in position.

22. A grooming tool comprising:
(a) a handle; and
(b) a head attached to the handle; the head having a plurality of curved blades linearly adjustable relative to the handle in at least an extended position and a non-extended position;
  (i) the blades having a proximal portion and a distal portion, the distal portion defining free-end tips;
  (ii) the blades having a grooming edge curved between the end tips as the blades extend from the end tips to the proximal portion; and
wherein the grooming edge of the curved blades are curved between 60-90°.

23. The grooming tool of claim 22 wherein the head includes a blade carrier holding the plurality of blades in a fixed position in the blade carrier.

24. The grooming tool of claim 23 wherein:
(a) the head includes a housing having an interior volume therein; and
(b) the blade carrier is operably positioned in the interior volume of the housing and constructed and arranged to be adjustable in at least a first position and second position;
(c) the blades having a proximal portion adjacent to the blade carrier, and a distal portion spaced from the blade carrier;
  (i) when the blade carrier is in the first position, the blades are in the extended position; and
  (ii) when the blade carrier is in the second position, the blades are in the non-extended position and the distal portion of the blades is spaced nearer the housing than when in the extended position.

25. The grooming tool of claim 24 wherein the head includes a blade adjustor operably associated with the blade carrier to move the blade carrier between the first position and the second position.

26. The grooming tool of claim 25 wherein the head includes a locking tab arrangement constructed and arranged to releasably lock the blade carrier in at least the first position and the second position.

27. A grooming tool comprising:
(a) a handle; and
(b) a head attached to the handle; the head having a housing with a blade carrier and a plurality of curved blades held by the blade carrier; the blades having a proximal portion adjacent the blade carrier and a distal portion spaced from the blade carrier; wherein the blades are linearly adjustable in at least an extended position and a non-extended position relative to the handle in which the distal portion is spaced nearer the housing in the non-extended position than when in the extended position; and
wherein a distance between the extended position and non-extended position ranges between 3-10 mm.

28. The grooming tool of claim 27 wherein the curved blades are releasably lockable in at least the extended position and non-extended position.

29. The grooming tool of claim 28 wherein the curved blades are curved between 60-90°.

30. The grooming tool of claim 27 wherein:
(a) the handle has a gripping member sized for gripping by a human hand and having a longitudinal axis therethrough; and
(b) the head has a longitudinal axis non-coaxial with the gripping member longitudinal axis.

31. The grooming tool of claim 30 wherein the handle includes a v-shaped bridge between the gripping member and the head.

32. The grooming tool of claim 27 wherein the head includes a blade carrier holding the plurality of blades in a fixed position in the blade carrier.

33. A grooming tool comprising:
(a) a handle having a gripping member sized for gripping by a human hand and having a longitudinal axis therethrough;
(b) a head attached to the handle; the head having a longitudinal axis non-coaxial with the gripping member longitudinal axis; the head having a plurality of curved blades adjustable in at least an extended position and a non-extended position; and
wherein the handle includes a v-shaped bridge between the gripping member and the head.

34. The grooming tool of claim 33 wherein the head includes a blade carrier holding the plurality of blades in a fixed position in the blade carrier.

35. The grooming tool of claim 34 wherein the curved blades are curved between 60-90°.

36. A grooming tool comprising:
(a) a handle; and
(b) a head attached to the handle;
  (i) the head having a plurality of curved blades adjustable in at least an extended position and a non-extended position;
  (ii) the head including a blade carrier holding the plurality of blades in a fixed position in the blade carrier;
  (iii) the head including a housing having an interior volume therein;
  (iv) the blade carrier being operably positioned in the interior volume of the housing and constructed and arranged to be adjustable in at least a first position in which the blades are in the extended position, and second position in which the blades are in the non-extended position, the blade carrier having first and second grooves therein;
  (v) the blades having a proximal portion adjacent to the blade carrier, and a distal portion spaced from the blade carrier; when the blade carrier is in the second position, the distal portion of the blades is spaced nearer the housing than when in the blade carrier is in the first position;
  (vi) the head including a blade adjustor operably associated with the blade carrier to move the blade carrier between the first position and the second position;
  (vii) the head including a locking tab arrangement constructed and arranged to releasably lock the blade carrier in at least the first position and the second position; the locking tab arrangement including a first tab and second tab;
  (A) the first tab having a first locking finger slidably located in the first groove; and
  (B) the second tab having a second locking finger slidably located in the second groove; and
wherein the blade carrier has first groove teeth along the first groove and second groove teeth along the second groove; and the first locking finger of the first tab has first tab teeth, and the second locking finger of the second tab has second tab teeth; the first tab teeth releasably engages the first groove teeth, and the second tab teeth releasably engages the second groove teeth to releasably lock the blade carrier in the first position and second position.

37. A grooming tool comprising:
(a) a handle; and
(b) a head attached to the handle;
  (i) the head having a plurality of curved blades adjustable in at least an extended position and a non-extended position;
  (ii) the head including a blade carrier holding the plurality of blades in a fixed position in the blade carrier;
  (iii) the head including a housing having an interior volume therein;
  (iv) the blade carrier being operably positioned in the interior volume of the housing and constructed and arranged to be adjustable in at least a first position in which the blades are in the extended position; and second position in which the blades are in the non-extended position; the blade carrier having first and second grooves therein;
  (v) the blades having a proximal portion adjacent to the blade carrier, and a distal portion spaced from the blade carrier; when the blade carrier is in the second position, the distal portion of the blades is spaced nearer the housing than when in the blade carrier is in the first position;
  (vi) the head including a blade adjustor operably associated with the blade carrier to move the blade carrier between the first position and the second position;
  (vii) the head including a locking tab arrangement constructed and arranged to releasably lock the blade carrier in at least the first position and the second position; the locking tab arrangement including a first tab and second tab;
    (A) the first tab having a first locking finger slidably located in the first groove; and
    (B) the second tab having a second locking finger slidably located in the second groove; and
wherein the locking tab arrangement further includes a spring compressed between the first tab and second tab.

38. A grooming tool comprising:
(a) a handle; and
(b) a head attached to the handle;
  (i) the head having a plurality of curved blades adjustable in at least an extended position and a non-extended position;
  (ii) the head including a blade carrier holding the plurality of blades in a fixed position in the blade carrier;
  (iii) the head including a housing having an interior volume therein;
  (iv) the blade carrier being operably positioned in the interior volume of the housing and constructed and arranged to be adjustable in at least a first position in which the blades are in the extended position, and second position in which the blades are in the non-extended position;
  (v) the blades having a proximal portion adjacent to the blade carrier, and a distal portion spaced from the blade carrier; when the blade carrier is in the second position, the distal portion of the blades is spaced nearer the housing than when in the blade carrier is in the first position;
  (vi) the head including a blade adjustor operably associated with the blade carrier to move the blade carrier between the first position and the second position; the blade adjustor including a plate having a finger mount projecting outside of the housing and an engagement bar oriented against the blade carrier; and
wherein the blade adjuster further includes a spring oriented between the housing and the plate.

* * * * *